(12) United States Patent
Wooten

(10) Patent No.: US 6,428,043 B1
(45) Date of Patent: Aug. 6, 2002

(54) VEHICLE HEAD RESTRAINT DEVICE

(76) Inventor: Arnold Gray Wooten, P.O. Box 12252, Winston Salem, NC (US) 27117-2252

( * ) Notice: Subject to any disclaimer, the term of this patent is extended or adjusted under 35 U.S.C. 154(b) by 0 days.

(21) Appl. No.: 09/790,934

(22) Filed: Feb. 22, 2001

(51) Int. Cl.$^7$ .............................................. B60R 21/02
(52) U.S. Cl. ............................. 280/748; 2/410; 2/411; 2/416; 180/271
(58) Field of Search .......................... 280/748; 180/271, 180/274, 282; 2/425, 424, 414, 411, 410, 416; 244/121, 122 R, 122 A, 122 AG; 297/464, 216.1, 216.12

(56) References Cited

U.S. PATENT DOCUMENTS 4,477,041 A * 10/1984 Dunne ........................ 244/122
4,664,341 A * 5/1987 Cummings ........... 244/122 AG
4,909,459 A * 3/1990 Patterson ............. 244/122 AG
4,923,147 A * 5/1990 Adams et al. ........ 244/122 AG

FOREIGN PATENT DOCUMENTS

GB         2252895     * 8/1992  .......... 244/122 AG
WO       WO88/01968  * 3/1988  .......... 244/122 AG

* cited by examiner

*Primary Examiner*—Eric Culbreth

(57) ABSTRACT

A head restraint device is provided for vehicle drivers and the like. The device allows the head to turn from side to side but restricts the forward and rearward movement as may occur during an abrupt stop while traveling at a high velocity. Cables are slidably affixed to the passenger compartment frame and resilient members dampen sudden forward or rearward head movement during vehicle impact.

13 Claims, 4 Drawing Sheets

VEHICLE HEAD RESTRAINT DEVICE

FIELD OF THE INVENTION

The invention herein pertains to a safety device for use by race car drivers and others that are subjected to sudden, abrupt stops of their vehicles whereby harsh forces applied can cause head and neck injuries.

DESCRIPTION OF THE PRIOR ART AND OBJECTIVES OF THE INVENTION

In recent years race cars and other vehicles have obtained higher speeds and more rapid acceleration which in turn creates hazardous conditions for the drivers. While seat belts have contributed to greater safety and have helped minimize driver and passenger injuries by maintaining the drivers or passengers in their seats, high speed impacts are still often fatal as the head and neck remain vulnerable to whiplash and contact injuries. HANS devices are one recent attempt to prevent such head and neck injuries by restricting the movement of the head. However, HANS devices allow little if any rotation or front to back movement of the head, thereby creating a "claustrophobic" effect for many drivers, thus making their use somewhat undesirable.

Also, certain prior art devices which may be effective in preventing head and neck injuries are awkward and time consuming to adorn and are sometimes dangerous in that the wearer cannot quickly escape in the event of an accident, and he may not be capable of manipulating complex release mechanisms due to sustained injuries.

Thus, with the problems and disadvantages of prior art vehicle restraint safety devices known, the present invention was conceived and one of its objectives is to provide a restraint device and method to protect the head and neck which will allow the user full head rotation but only limited front to rear movement, thus preventing excessive forward head movement and whiplash action.

It is another objective of the present invention to provide a restraint device which can be readily placed in conventional race cars and other vehicles.

It is still another objective of the present invention to provide a head restraint device which allows the user normal head rotation from side to side and limited, dampened front to back movement as required for the individual user.

It is also an objective of the present invention to provide a head restraint device which is attached to the top of the helmet or other headgear and to the vehicle compartment frame thus preventing an obstruction or difficulty while entering or exiting the vehicle.

It is a further objective of the present invention to provide a head restraint device which can be quickly and easily attached or disattached from the headgear as needed using one hand.

Various other objectives and advantages of the present invention will become apparent to those skilled in the art as a more detailed description is set forth below.

SUMMARY OF THE INVENTION

The aforesaid and other objectives are realized by providing a vehicle head restraint device which is slidably attached to the vehicle compartment frame. The restraint device includes a harness having a plurality of cables which allow only limited, selective front to back head movement but allows freedom in side to side head rotation. Thus, when the driver is seated in the vehicle and the restraint device attached to the top of his helmet, the driver can turn his head normally to view out the left and right side windows. However, should the vehicle strike a wall or other obstacle, the harness will efficiently prevent excessive front to back head movement or whiplash action which can cause a fatality.

The restraint device includes a connector in the form of a planar plate which is affixed to a series of cables slidably attached to the front and rear of the compartment frame. An aperture within the connector allows a helmet post to be received therethrough. When so positioned, a quick release pin passes through the top of the post thus preventing the post from inadvertent withdrawal from the connector aperture. The cables pass from the connector through guides on the compartment frame and stops at the terminal end of the cables allowing only limited sliding movement for each of the cables. Resilient members in the form of compression springs retard or dampen the movement of the cable as forces are applied to the cables upon impact, such as when the vehicle crashes into a wall.

DETAILED DESCRIPTION OF THE PREFERRED EMBODIMENT AND OPERATION OF THE INVENTION

Figure 1:
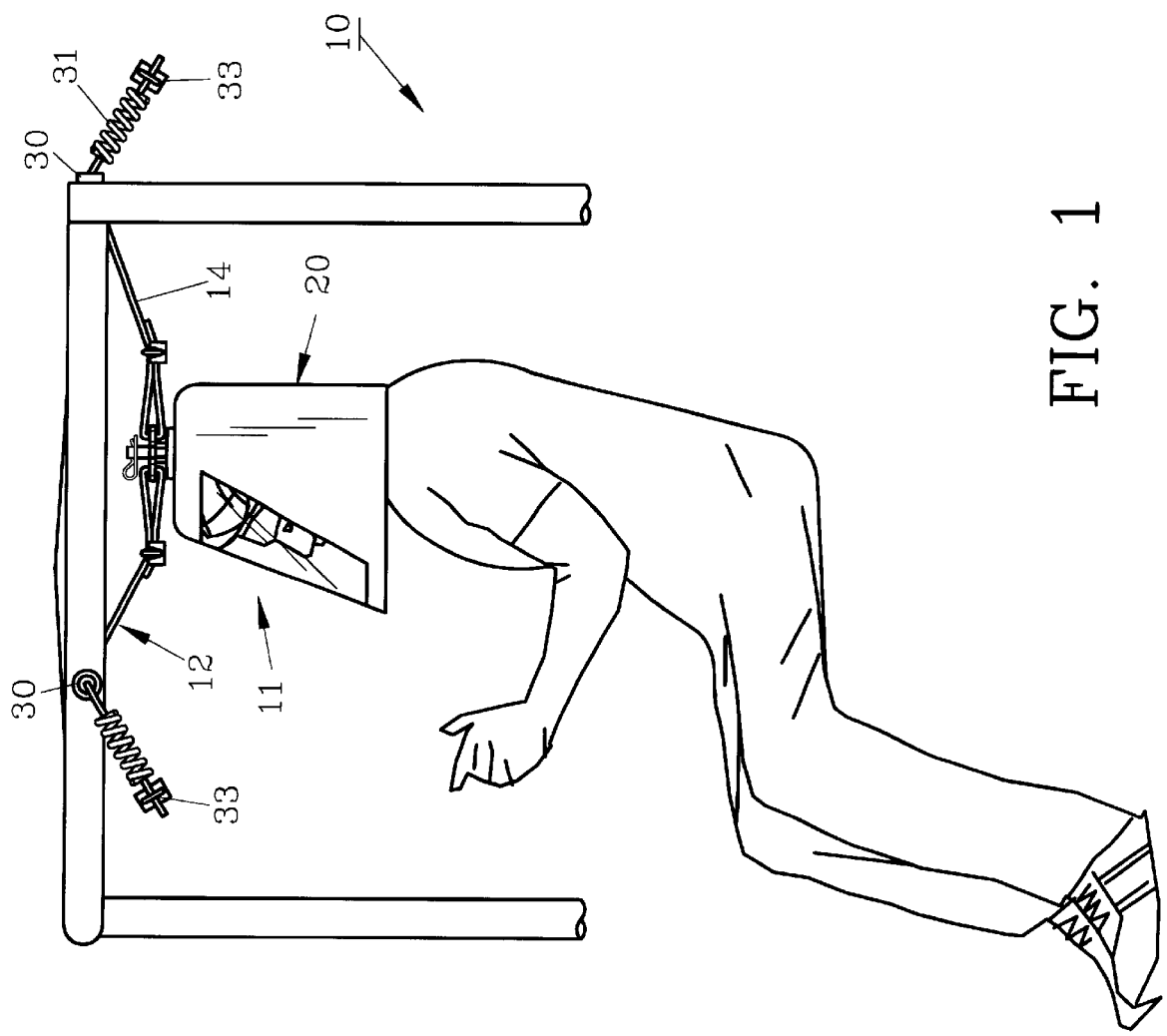
FIG. 1 shows a side view of a race car compartment frame and with a helmet attached to the head restraint harness.
Figure 2:
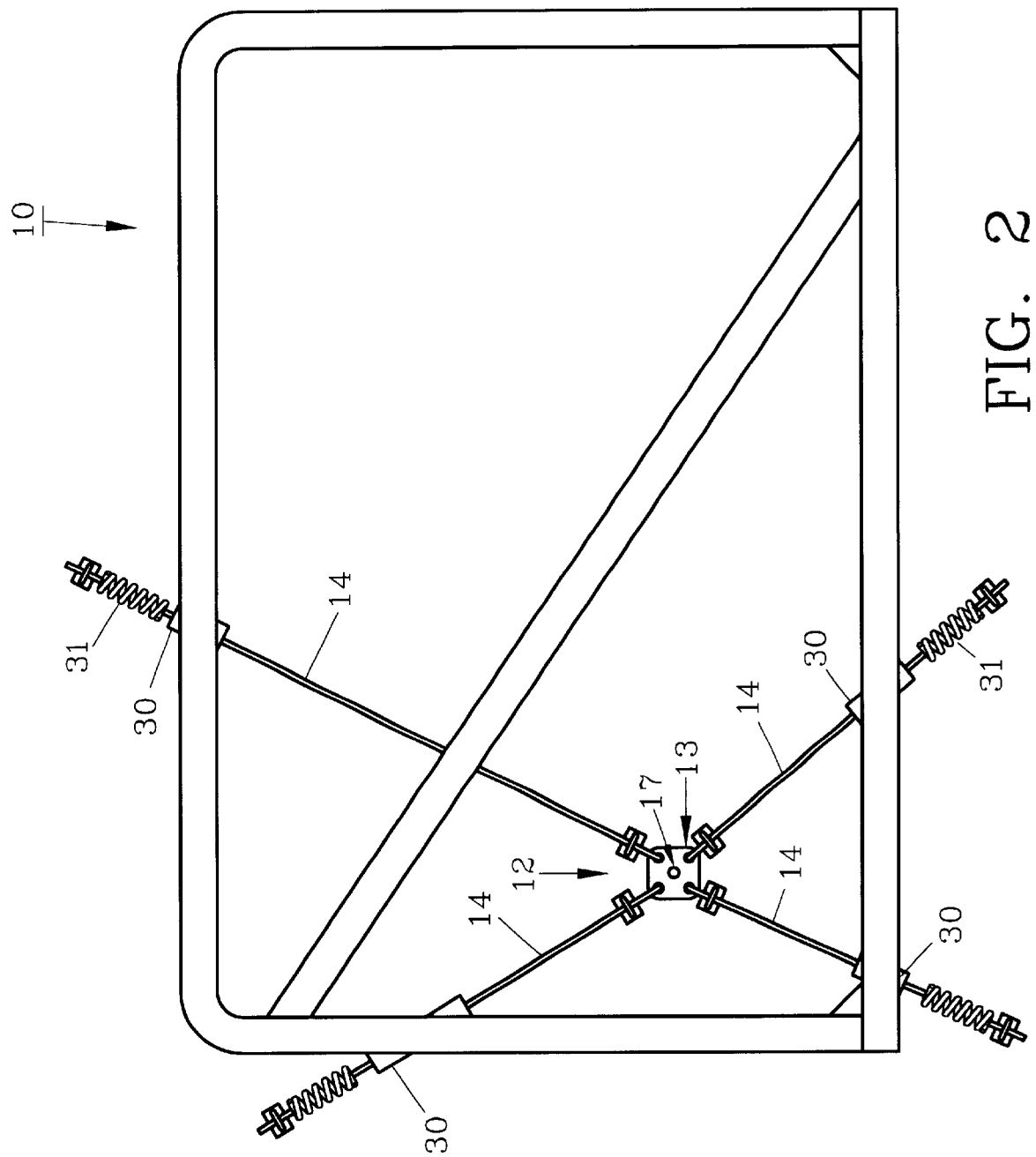
FIG. 2 demonstrates a top view of a race car compartment frame with the head restraint harness affixed thereto.
Figure 3:
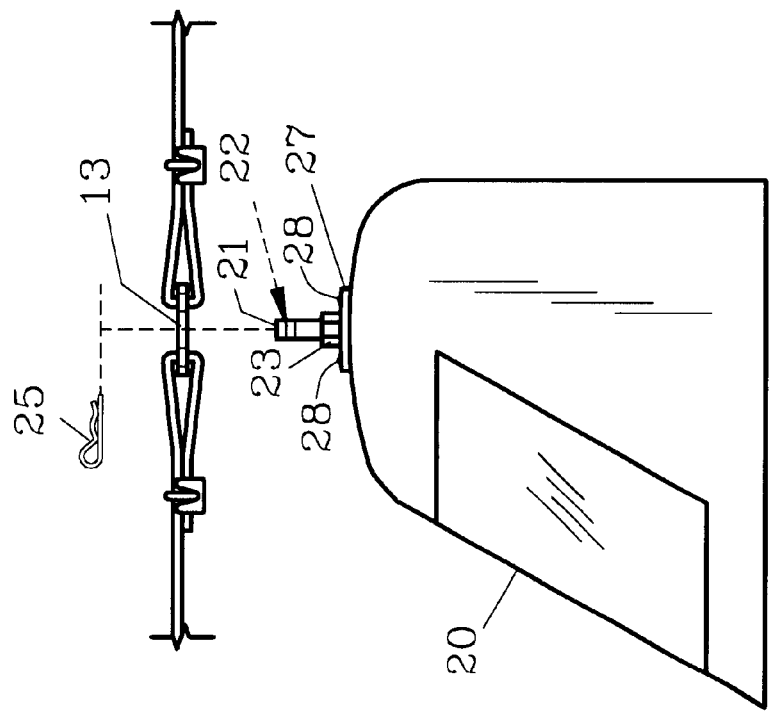
FIG. 3 depicts an enlarged view of the helmet as exploded from the harness.
Figure 4:
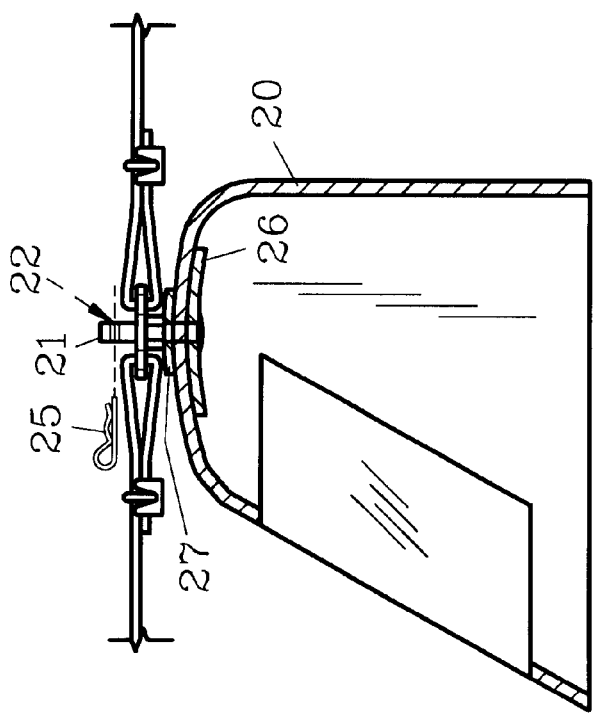
FIG. 4 pictures an enlarged cross-sectional view of a portion of the helmet and post removed from the harness.

For a better understanding of the invention and its operation, turning now to the drawings, FIG. 1 illustrates a side schematic view of an exposed, typical vehicle compartment frame 10 as utilized in racing vehicles as may be sanctioned by NASCAR or other racing organizations. Compartment frame 10 is typically formed from tubular steel and is welded together to protect the driver during rollovers, crashes and other accidents. Preferred restraint device 11 is affixed to compartment frame 10 and as shown in FIG. 2 includes a harness 12 having a planar connector 13 suspended from compartment frame 10 by four steel cables 14. Two of the cables are forward of the driver and two are rearward thereof. Cables 14 are preferably formed of type 302 stainless steel having a 7×19 strand core and cables 14 are approximately one-eighth inch (3.17 mm) in diameter. Cables, 14 are preferably swaged to connector 13 which is approximately 3.5" long by 3.5" wide (88.9×88.9 mm) and ³⁄₁₆" (4.76 mm) in thickness. Aperture 17 is centrally positioned in connector 13 and is 0.6 inches (15.24 mm) in diameter to receive post 21 shown on helmet 20 in FIG. 3. Helmet 20 is a typical helmet as used by race car drivers but has been modified to include steel post 21 which is 0.5" (12.7 mm) in diameter. As seen, post 21 is positioned through aperture 17 (FIG. 1) for assembly with harness 12. Connector 13 will rest on spacer 23 which allows helmet 20 to freely rotate without abrading helmet 20. Harness locking pin 25 is easily positioned through aperture 22 to secure post 21 to harness 12. Pin 25 is conventional and easily locks post 21 to harness 12 and can be easily removed when necessary using only one hand. As shown in enlarged FIG. 4, helmet 20 includes post 21 rigidly affixed to inner post plate 26. Outer post plate 27 is attached to helmet 20 and inner post plate 26 by conventional rivets 28 or the like for secure engagement. Post 21 extends preferably about 1" (2.54 mm) above the top of helmet 20.

Figure 5:
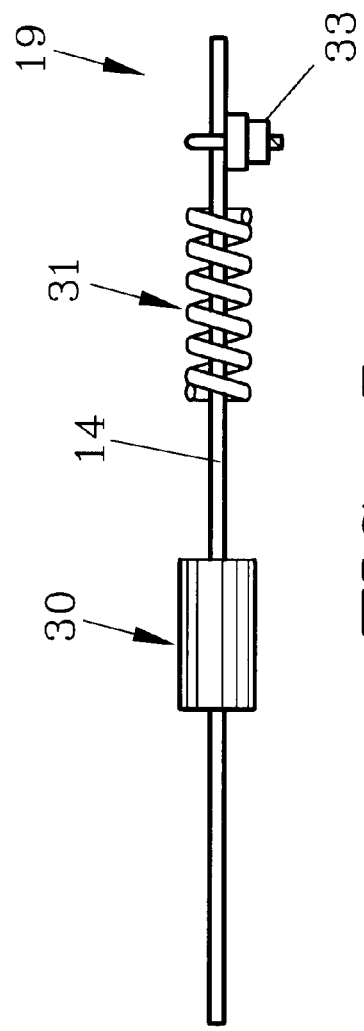
FIG. 5 illustrates an enlarged view of the terminal end of the cable showing the cable slide and relaxed compression spring.
Figure 6:
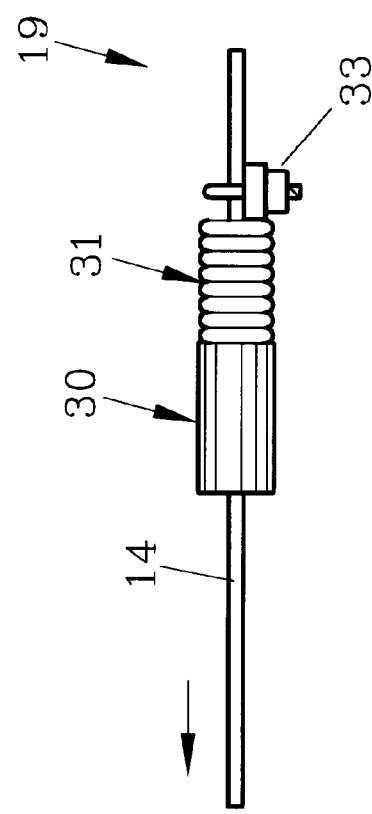
FIG. 6 features an enlarged view of the terminal end of the cable with the compression spring compressed.

In order to secure cables 14 to compartment frame 10, steel cable guides 30 are employed. Cable guides 30 receive cables 14 and are welded within compartment frame 10 as shown in FIG. 1. Cable guides 30 are formed from steel and include an internal bore of 0.25" (6.3 mm) to easily allow cables 14 to slide therethrough. Terminal ends 19 as seen in FIGS. 5 and 6 of cables 14 are fitted with standard U-shaped cable clamps or stops 33 having threaded ends with nuts for selective placement or adjustment along terminal ends 19 as needed. Cable stops 33 are preferably adjustable but can be permanently affixed to terminal ends 19 of cables 14 by welding or otherwise if desired. Resilient members 31 mounted on cables 14 consist of steel compression springs which dampen the motion of stops 33 as terminal ends 19 are pulled through guides 30 to compress resilient member 31 as shown in FIG. 6 such as when extreme forces are applied during a crash as shown by the directional arrow.

As would be understood, cables 14 have some excess length, preferably 4" (101.6 mm) as they extend through guides 30, but this excess length can be individually selected for minimal or normal driver movement as desired. It is so limited to restrain the head and prevent head and neck injuries during violent impact when extreme forces are applied to the head as in high impact situations.

The preferred method of restraining the head of a vehicle driver, passenger or the like includes the steps of placing headgear such as helmet 20 having post 21 on the driver, installing cable harness 12 on vehicle compartment frame 10 to allow harness 12 limited front to back sliding motion. Next, connector 13 is releasably attached to helmet post 21, which allows free rotation (side to side) head movement. Cables 14 are adjusted to allow only limited front to rear cable movement such as about 4" (101.6 mm). Thus, in the event of a crash or sudden impact, the head of the driver will be restrained, the motion of the head dampened to prevent forward or rearward motion in excess of the amount of the predetermined, selected slack in cables 14, thereby preventing a whiplash type injury and possible death.

The illustrations and examples provided herein are for explanatory purposes and are not intended to limit the scope of the appended claims.

I claim:

1. A head restraint device for a vehicle comprising:
    a frame, headgear, said headgear positioned within said frame, a forward cable, said forward cable pivotally affixed to said headgear and slidably anchored to said frame in front of said headgear, a rearward cable, said rearward cable pivotally affixed to said headgear and slidably anchored to said frame behind said headgear to limit the head movement of a vehicle occupant wearing said headgear.

2. The head restraint device of claim 1 wherein said headgear comprises a helmet.

3. The head restraint device of claim 1 further comprising a resilient member, said resilient member contiguous said forward cable proximate said frame.

4. A head restraint device comprising:
    a harness, headgear, said harness pivotally joined to the top of said headgear, a frame, said frame surrounding said headgear, said frame comprising a plurality of cable guides, said harness comprising a plurality of cables, said cables each slidably positioned in different ones of said cable guides whereby said cables restrain the movement of said headgear.

5. The head restraint device of claim 4 further comprising a plurality of cable stops, one of said cable stops affixed to each one of said cables proximate said frame to limit said cable movement relative to said frame.

6. The head restraint device of claim 4 further comprising a post, said post affixed to the top of said headgear, said harness pivotally joined to said post.

7. The head restraint device of claim 6 wherein said harness further comprises a connector, said connector attached to said cables, said connector defining an aperture, said post positioned in said aperture.

8. The head restraint device of claim 7 wherein said post is pivotally positioned in said aperture.

9. The head restraint device of claim 4 wherein said plurality of cables comprises a pair of forward cables and a pair of rearward cables, said forward cables anchored to said frame in front of said headgear, and said rearward cables are anchored to said frame behind said headgear.

10. The head restraint device of claim 4 wherein said frame comprises a vehicle compartment frame.

11. The head restraint device of claim 4 wherein said harness comprises a forward cable, said forward cable positioned in front of said headgear and a rearward cable, said rearward cable positioned behind said headgear.

12. A head restraint device comprising:
    a frame, a harness, said harness attached to said frame and to said headgear, said headgear affixed to said harness to retrain the movement of the head while the headgear is worn, a plurality of cables, a plurality of cable stops, said cable stops affixed to different ones of said cables at distal ends thereof, a plurality of cable guides, said cable guides attached to said frame, each of said cables positioned in different ones of said guides, said cable stops preventing said cables from escaping said cable guides, and a plurality of resilient members, said resilient members positioned on each of said cables between said cable stops and said cable guides, whereby said restraint will limit head movement when said headgear is worn.

13. The head restraint device of claim 12 further comprising a post, said post mounted on said headgear, and a connector, said connector attached to said cables, said connector defining an aperture, said post pivotally positioned in said aperture to allow said headgear to turn.

* * * * *